Figure 3:
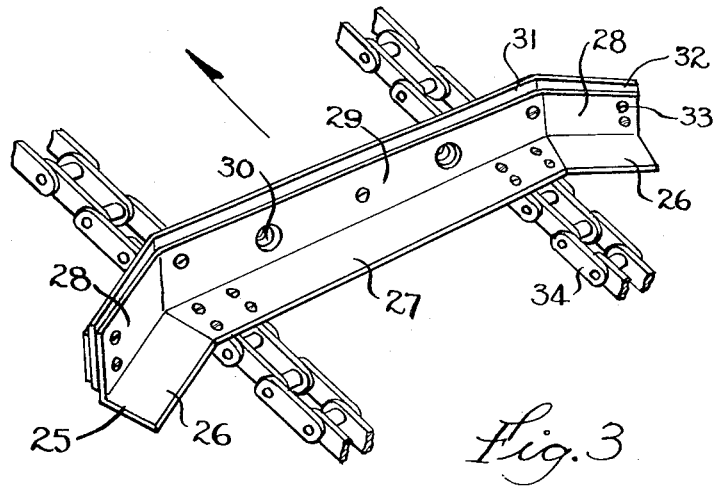

United States Patent

Schmutzler et al.

[15] 3,674,145

[45] July 4, 1972

[54] METHOD AND APPARATUS FOR CLARIFYING LIQUIDS

[72] Inventors: David L. Schmutzler, Marinette; John H. Schmutzler, Port Washington, both of Wis.

[73] Assignee: Jadair, Incorporated, Port Washington, Wis.

[22] Filed: March 26, 1970

[21] Appl. No.: 22,929

[52] U.S. Cl............................210/73, 210/84, 210/96, 210/138, 210/252, 210/526
[51] Int. Cl..........................................B01d 11/18
[58] Field of Search...............210/73, 74, 84, 252, 257, 526, 210/540, 532, 96, 97, 138, 104

[56] References Cited

UNITED STATES PATENTS

| | | | |
|---|---|---|---|
| 1,864,778 | 6/1932 | Tark | 210/526 X |
| 2,233,448 | 3/1941 | Fischer | 210/526 |
| 3,228,531 | 1/1966 | Prousman | 210/532 |
| 3,409,275 | 11/1968 | Miller et al | 210/526 X |

Primary Examiner—John Adee
Attorney—Topel and Jabas

[57] ABSTRACT

Liquids containing contaminating particles of various sizes are treated in a multi-stage system wherein the liquid is delivered into the rear end of a first stage of a tank divided longitudinally into two stages; passing the liquid into contact with and under a pair of baffles; forcing the liquid forward in the first stage to effect a settling of the coarser particles; slowly conveying the settled particles forward, up and out of the first stage of the tank; passing the liquid from the first stage to the second stage through a crossover weir which skims off the cleanest liquid; continuously forcing the liquid down to the bottom of the second stage and under a baffle, minimizing the settling distance for the finer particles; slowly conveying the settled particles forward, up and out of the second stage; and skimming the cleanest liquid at an outlet baffle located at the rear of the second stage adjacent the inlet of the first stage.

13 Claims, 4 Drawing Figures

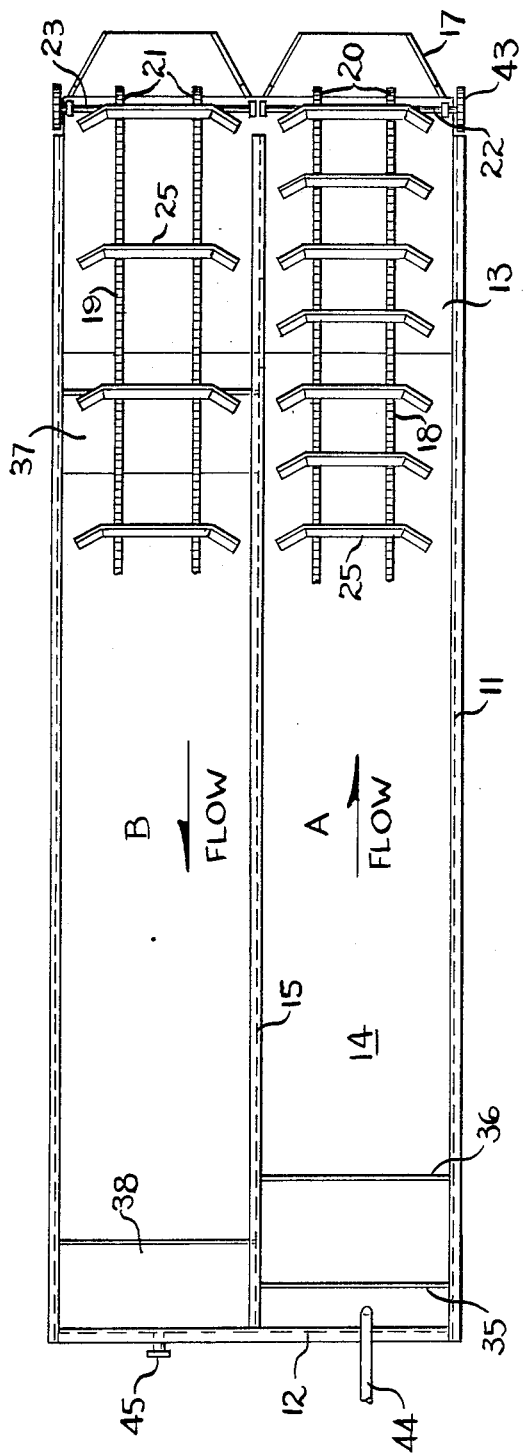
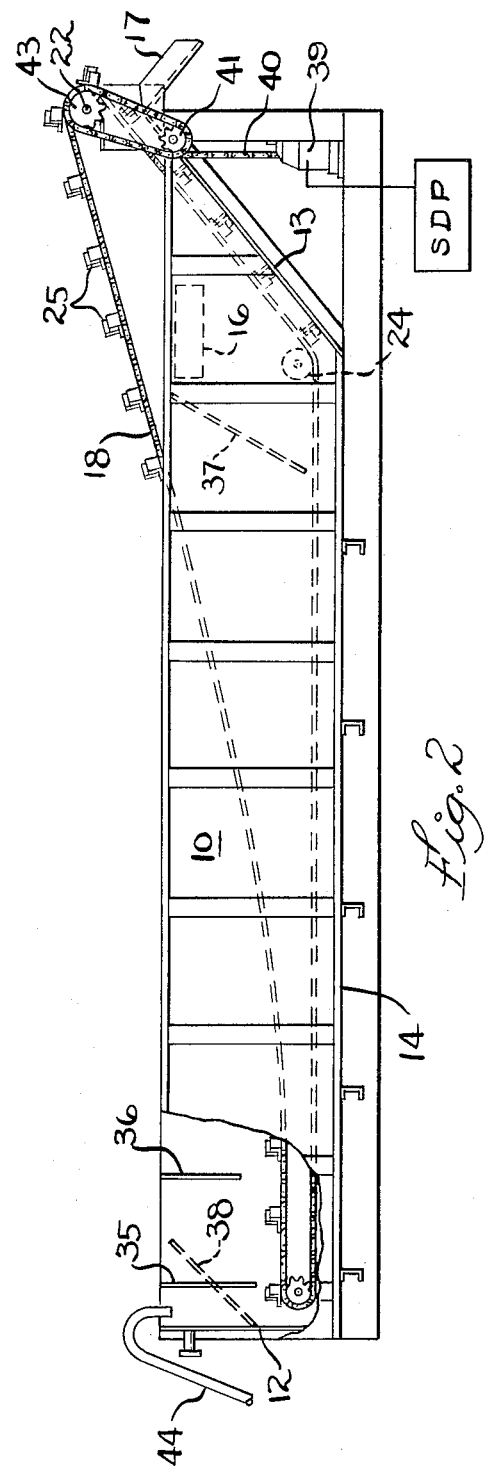

INVENTORS
DAVID L. SCHMUTZLER
JOHN H. SCHMUTZLER
BY
ATTORNEY

METHOD AND APPARATUS FOR CLARIFYING LIQUIDS

This invention relates to an apparatus and method for clarifying liquids. Although the apparatus and method can be used in connection with a variety of liquids and particulate matter contained therein, the invention will be described as embodied in an apparatus and method clarifying water containing dusts, particles, aggregates and the like, as for example, those found in concrete and concrete washings, washings from sand and gravels and those produced by asphalt plants.

The enactment of strict pollution control laws requires advancements in technology to provide positive clarification action at an economical cost. Many firms which previously emptied polluted streams of liquids into rivers, lakes or settling ponds have been served with pollution abatement orders. Thus, suitable means must be employed for clarifying the contaminated liquids to enable the discharge stream to pass pollution control requirements. This means apparatus which can effectively clarify large volumes of water and/or other liquids in relatively short periods of time. In addition, where water use restrictions limit the amount of water available, reuse of essentially all of the water is of prime necessity.

Heretofore, clarifying equipment of various types have been employed. Typical examples are shown in U.S. Pat. Nos. 1,957,168; 2,990,064; 3,409,275 and 3,456,798. None of the prior devices employ the novel combination of structure and steps employed in the present invention. The apparatus and method disclosed herein provides for the treatment of a variety of contaminated streams both through fixed and portable installations with a minimum of manpower for installation and operation.

A two-stage system utilizing paddles mounted on endless conveyor removes agglomerated solids. Contaminated water is introduced into the receiver section of a first stage where the turbulent influent is quelled and becomes a fluid dynamically controlled mass flowing smoothly into the first stage. Here the initial settling takes place. A crossover weir at the front of the first stage skims the cleanest water which is close to the surface and feeds it to the receiving section of the second stage. The second stage provides final clarification. At the rear of the second stage, the cleanest water appears near the surface and is withdrawn through the clarified water outlet port.

The general object of the present invention is to provide an apparatus for continuously removing dusts, particles, aggregates and the like from liquids in a rapid, efficient manner to provide liquids clarified to meet projected pollution control requirements.

Another object of the present invention is to continuously clarify liquids to recycle the liquids for reuse with a minimum amount of makeup liquid.

Another object of the present invention is to provide an apparatus for rapid, convenient and economical recovery of contaminating matter or reusable solids from liquids.

Another object of the present invention is to provide a two-stage treatment for differential removal of contaminants.

Another object of the present invention is to provide a variable speed operation which can be automatically modified according to the degree of contamination and treatment desired.

Another object of the present invention is to provide a specific baffle configuration for increased effectiveness in turbulence suppression and flow control which enhances solids and liquid separation.

Another object of the present invention is to provide conveying means and paddle configurations for positive movement of solids without inhibiting the required settling action.

Yet another object of the invention is to provide apparatus which can be used with a variety of types of pollution control equipment.

The above objects are accomplished by passing contaminated liquids into a two-stage chamber or tank in which heavier solids are removed in a first stage and suspended solids are settled out over a period of time and removed from the second stage. The removal is accomplished by moving paddles through the liquid and transporting the solids up a discharge ramp and over the edge. Baffles strategically located in both stages materially affect the action of the apparatus. A variable speed drive and automatic controls regulate residence time to correspond with degree of contamination and clarification required.

Figure 4:
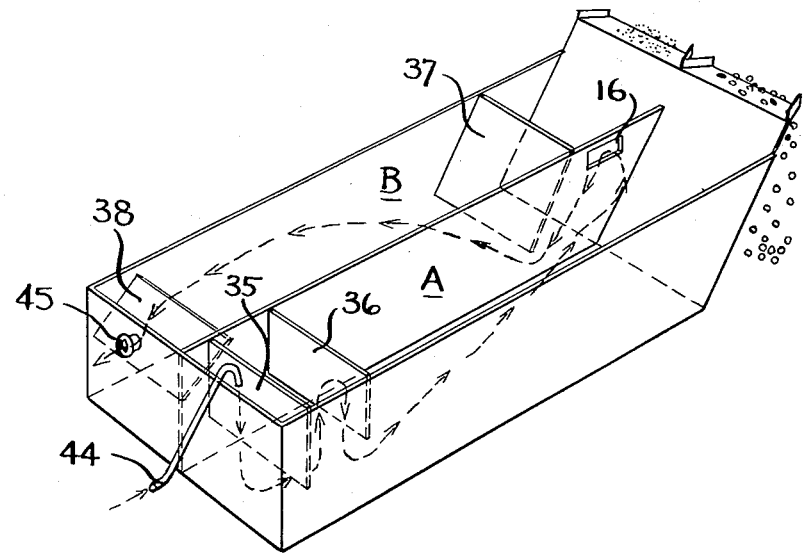

Further details, advantages and objects of the invention will be apparent from the following specifications and appended drawings wherein:

FIG. 1 is a top view of the clarifying apparatus embodying one form of the invention,
FIG. 2 is a side view of the clarifying apparatus,
FIG. 3 is a perspective view of a paddle,
FIG. 4 is a schematic perspective, flow diagram of the clarifying apparatus.

Referring first to FIG. 1, there is shown a clarifying apparatus suitable for treating a variety of contaminated liquids. The apparatus comprises a generally rectangular elongated chamber or tank 10 consisting of sides 11, rear end 12, disposal ramp 13 and bottom 14. A dividing plate 15 separates a first Stage A from second Stage B. The dividing plate 15 may be positioned at any point between the sides 11, but generally is located at the midpoint and parallel thereto. A weir 16 located in the upper forward portion of the dividing plate provides for the passage of liquid from one stage of the tank to the other. A drainboard 17 is an integral part of the disposal ramp 13 and leads to a discharge station located below the upper edge of the ramp 13.

Endless chains 18 and 19 are mounted in Stages A and B on sprockets 20 and 21 carried on shafts 22 and 23 as shown in FIGS. 1 and 2. Idlers 24 in Stages A and B hold down the endless chains 18 and 19 for positioned movement.

A series of paddles 25 are affixed to the endless chains 18 and 19 respectively. The paddles are carried by the rotating endless chains so that they move forward while in position on the bottom of the tank. Stage A which removes the heavier solids employs paddles spaced at close intervals. Paddles used in Stage B are of the same design but spaced at longer intervals. FIG. 3 shows a typical paddle. The paddle consists of lateral upper edges 26 connected to center edge 27 and side flanges 28. Center flange 29 attached to side flanges 28 and center edge 27 has drain holes 30 located therein. A continuous hard rubber strip 31 is fastened to flanges 28 and 29 by bolts 33 and a metal backing strip. Ends 32 of strip 31 are tapered toward the edges of flanges 28. A series of bolts or rivets connect the paddles to a link 34 forming part of the endless chains 18 or 19.

A series of baffles are positioned at several positions to direct the flow in the tank. Inlet baffle 35 is positioned adjacent to and parallel with the end 12 of the tank 10. A rear baffle 36 is positioned parallel to inlet baffle 35. The distance between the two baffles 35 and 36 is approximately twice the distance from baffle 35 to end 12 but is dependent upon the influent flow rate, velocity and composition. The lower edge of baffle 35 extends below the lower edge of baffle 36.

Inclined baffle 37 is located in the forward portion of Stage B immediately behind the rear edge of weir 16. This baffle extends down to close proximity with the bottom 14. A discharge baffle 38 is positioned at the rear of Stage B. The upper edge extends to a point slightly below the top edges of sides 11. In operation, the water level is just above the upper edge of the discharge baffle.

A drive chain 40 connects drive means 39 with take-off gear 41 at the forward portion of the tank. Connecting chain 42 provides communication between drive gear 41 and take-off gear 43 mounted on shaft 22. An automatic variable control mounted on the drive means 39 is actuated by a sensing device mounted at the outlet. The speed of the endless chains 18 and 19 is varied according to the degree of clarity of the discharge. Programmed automatic controls such as a conventional stepping drum programmer and delay-off timers, designated schematically at SDP in FIG. 2, vary the periods of the conveyor's various operating velocities and provide for periods of non-movement of the paddle and chain system.

The contaminated liquid enters through inlet 44 either by means of gravity flow or by forced flow. As shown in FIG. 1, the inlet is positioned midway between the side 11 and dividing plate 15. Actual flow is determined by the liquid requirements, residence time required and composition of the contaminated liquid. Clarified liquid is taken off either by gravity flow or pumps.

Referring now to FIG. 4 there is shown a schematic, perspective flow diagram. The contaminated liquid enters through inlet 44 as indicated by the arrow in a turbulent state. This turbulent condition is present in the area between end 12 and inlet baffle 35. Very little settling takes place because of the unsettled state.

The incoming liquid passes under the lower edge of inlet baffle 35 into the area between baffle 35 and rear baffle 36. A portion of the liquid which is still turbulent has higher energy or curl and moves upward until it strikes rear baffle 36 or mixes with other randomly turbulent liquid. This produces a calming effect due to mutual cancellation by the various turbulent components so that the liquid passing under the rear baffle 36 is quelled and becomes a fluid dynamically controlled mass with a minimum amount of disturbing currents. As the liquid moves forward under the lower edge of rear baffle 36, the separation commences with the larger particles rapidly settling to the bottom due to the small initial settling distance. A natural density stratification begins to develop with the least dense, cleaner liquid rising upward and increasingly contaminated, more dense liquid appearing with increasing distance from the liquid surface. Paddles 25 attached to endless chain 18 move the settled matter along the bottom toward the disposal ramp. Paddle and liquid velocities are less than the sediment transport speed for the particles being settled. Sediment transport speed is defined as the speed or velocity of a flowing stream which will move particles of a certain size, mass and density along the bottom or bed of the stream.

The cleanest liquid in the forward portion of Stage A is skimmed off by the weir 16 and passes into the next stage. In the liquid remaining, the degree of contamination increases from top to bottom. Differential separation occurs in the area adjacent the moving paddles. The paddles are moved forward at a speed which allows maximum removal without producing turbulence which would cause the particles to rise into the contaminated liquid.

The hard rubber edge of the paddles provides a close sweeping action without the abrasiveness of metal on metal. As a paddle moves forward, it crosses the intersection of the disposal ramp 13 with the bottom 14. There is a tendency for the ends of the lower edge of the rubber strip to drag at the intersection causing the middle of the paddle to rise releasing a portion of the particles. Tapering the end edges of the rubber strip as shown in FIG. 3 minimizes the lifting action enabling a paddle to retain the contents in front of it until discharge.

As the paddle moves up the discharge ramp, a limited number of particles are washed through drain holes 30. Near the upper edge of the discharge ramp the paddle emerges from the liquid and moves up to the lip of the ramp where the load is pushed over the edge to the discharge station below. During the interval from the time the paddle emerges from the liquid until discharge over the edge, excess liquid is released through drain holes 30. This minimizes the amount of liquid loss and hence makeup required as well as producing a more solid discharge. The passage of particles through the drain holes 30 at this stage is minimized due to the increased density of the sediment caused by the compacting against paddles.

While the larger particles have been removed in Stage A, the generally smaller particles remain to be separated in Stage B. As the cleaner liquid containing smaller suspended particles passes through the weir into Stage B, it is forced downward by inclined baffle 37. Light turbulence which is created in the liquid during passage through the crossover weir 16 dissipates during its residence in the chamber created by the baffle 37, the side 11, disposal ramp 13 and the dividing plate 15. The partially contaminated liquid is smoothly introduced into the rear portion of Stage B through the opening between the lower edge of the inclined baffle and the bottom. Therefore, the particulate matter has a much smaller initial settling distance.

The final clarification process for the liquid in Stage B is essentially identical to that which took place in Stage A. The conveyor velocity in Stage B can be set independent from conveyor 18 through the use of a split drive. The cleanest water appears near the surface at the rear of the unit. The baffle 38 causes this surface water to be skimmed off for discharge through outlet port 45.

The apparatus can be constructed for permanent positioning or portable mounting in order to be versatile for use in various applications. The apparatus is particularly suited for use in clarifying contaminated liquid discharged from portable or permanent air washers or air scrubbers, sewage treatment, food processing waste liquids and industrial waste liquids. The clarified liquid may then be recycled in total or in part. In other applications, the liquid may be used in different processes or discharged for disposal. The solids which are removed may be a useful by-product or disposed of. The above items are intended to be illustrations of some of the applications of the apparatus. In addition, the apparatus and method described herein are suitable for clarifying a variety of contaminated liquids.

It is obvious that the general size and dimensions of the apparatus can be varied as well as materials and standard components. Now that the construction and operation of the apparatus as a whole, and its component parts, have been fully explained, it will be understood that modifications can be made within the scope of the appended claims, and it is to be further understood that certain features and sub-combinations will be useful in other systems though particularly well suited to the apparatus disclosed herein.

We claim:

1. A method of clarifying liquids having solid contaminants dispersed therein, which comprises:
   a. delivering the contaminated liquid adjacent the rear end of a tank divided longitudinally into two stages into a confined area;
   b. continuously passing liquid under a first baffle which reduces the turbulence and a second baffle to reduce the curl, produce a calming effect and provide a fluid dynamically controlled mass wherein the larger particles settle out;
   c. continuously forcing said liquid forward in Stage A to effect a settling of the coarser materials;
   d. slowly conveying the coarse settled particles forward in Stage A, up an inclined ramp and over the upper edge of the ramp;
   e. passing said liquid through a crossover weir into the forward portion of Stage B;
   f. continuously forcing the liquid entering Stage B to the bottom to minimize the settling distance for the finer particles remaining suspended in said liquid;
   g. slowly conveying the fine settled particles forward in Stage B, up an inclined ramp and over the upper edge of the ramp;
   h. passing the liquid in Stage B to the rear and upward over a discharge baffle to skim off the clearest liquid;
   i. conveying the particles in Stage A and Stage B up the inclined ramp for a brief period of time after emergence from the liquid to allow entrained liquid to drain off prior to discharge over the upper edge of the ramp;
   j. collecting the overflow from the discharge baffle and discharging either for recycle or disposal;
   k. controlling the level of said liquid to prevent overflow.

2. The method of claim 1 wherein the operation is performed according to a predetermined schedule to assure the removal of required amounts of contaminants.

3. The method of claim 1 wherein the movement of the conveying means is automatically controlled in each stage according to a predetermined program.

4. A system for clarifying liquids having contaminants dispersed therein comprising:
   a. a generally rectangular tank having a bottom, a pair of opposed sides, a rear end, and a disposal ramp all integrally connected, said disposal ramp being inclined at an angle so that the upper edge thereof extends beyond the forward edge of the bottom;
   b. a dividing plate substantially parallel to and positioned between the sides secured to the rear end, bottom and disposal ramp dividing said tank into Stage A and Stage B;
   c. a crossover weir positioned adjacent the upper edge of the dividing plate and in close proximity to the disposal ramp;
   d. conveying means in Stage A adapted for moving coarse solid contaminants forward, up and over the edge of the disposal ramp;
   e. paddles attached to said conveying means;
   f. a pair of baffles positioned adjacent the rear end in Stage A;
   g. a baffle adjacent to the rear edge of the crossover weir and inclined in essentially the same manner as the discharge ramp;
   h. conveying means in Stage B for moving fine, solid contaminants forward, up and over the edge of the disposal ramp;
   i. a discharge baffle integrally connected to the side, rear end and dividing plate in Stage B and inclined in essentially the same manner as the discharge ramp.
   j. a drive means for moving the conveying means in Stage A and B independently of each other;
   k. an inlet positioned adjacent the rear end and substantially midway between dividing plate and the side and between the rear end and the inlet baffle;
   l. an outlet positioned above the discharge baffle.

5. The apparatus of claim 4 wherein said paddles are bow shaped with the ends extending forward of the middle and having drain holes therein.

6. The apparatus of claim 5 wherein there is a strip of hard, flexible material attached to and extending below the lower edge of said paddles with said strip being tapered upwardly toward the ends of said paddle.

7. The apparatus of claim 4 wherein the upper edge of the disposal ramp extends above the sides and rear end of the tank.

8. The apparatus of claim 4 further including automatic controls for regulating the conveying means in Stages A and B.

9. A system for clarifying liquids having contaminants dispersed therein comprising:
   a. a generally rectangular tank having a bottom, a pair of opposed sides, a rear end, and a disposal ramp all integrally connected, said disposal ramp being inclined at an angle so that the upper edge thereof extends beyond the forward edge of the bottom;
   b. a dividing plate substantially parallel to and positioned between the sides secured to the rear end, bottom and disposal ramp dividing said tank into Stage A and Stage B;
   c. a crossover weir positioned adjacent the upper edge of the dividing plate and in close proximity to the disposal ramp;
   d. conveying means in Stage A adapted for moving coarse solid contaminants forward, up and over the edge of the disposal ramp;
   e. paddles attached to said conveying means;
   f. a baffle adjacent to the rear edge of the crossover weir and inclined in essentially the same manner as the discharge ramp in Stage B;
   g. conveying means in Stage B for moving fine, solid contaminants forward, up and over the edge of the disposal ramp;
   h. a discharge baffle integrally connected to the sides and dividing plate in Stage B and adjacent the rear end;
   i. a drive means for moving the conveying means in Stage A and Stage B independently of each other, and
   j. an outlet in the rear end of Stage B, positioned above the discharge baffle.

10. The apparatus of claim 9 wherein said paddles are bow shaped with the ends extending forward of the middle and having drain holes therein.

11. The apparatus of claim 10 wherein there is a strip of hard, flexible material attached to and extending below the lower edge of said paddles with said strip being tapered upwardly toward the ends of said paddle.

12. The apparatus of claim 9 including automatic controls for maintaining constant level and regulating movement of the conveying means in Stage A and Stage B.

13. The apparatus of claim 9 wherein the upper edge of the disposal ramp extends above the sides and rear end of the tank.

* * * * *